SEALEY & LEE.
Stereoscopic Case.
No. 27,572.
Patented March 20, 1860.
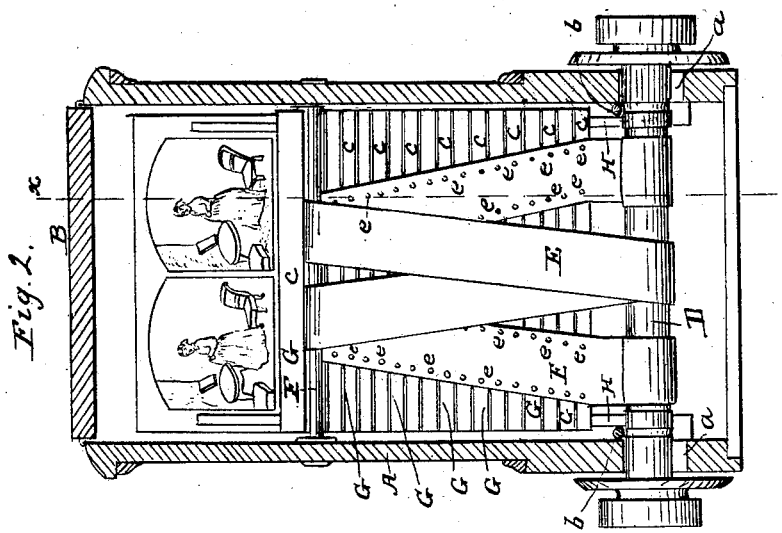
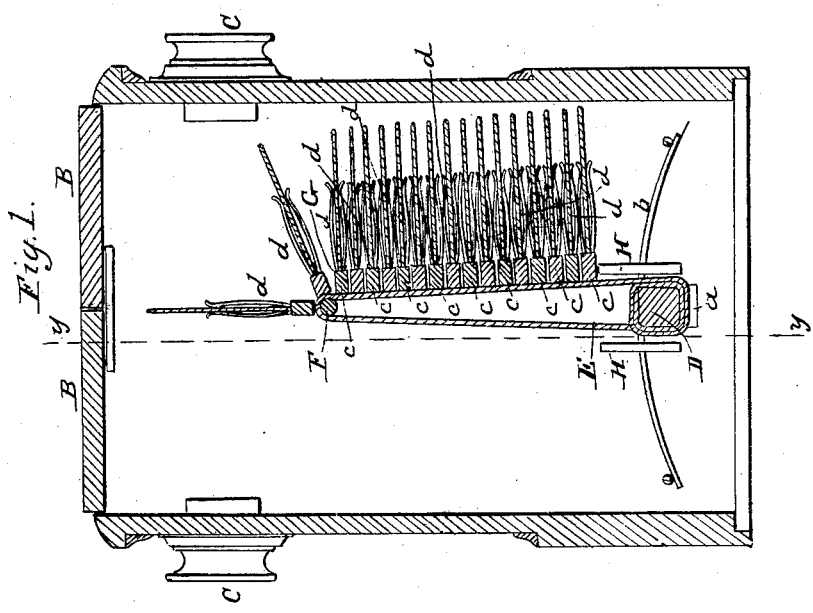

UNITED STATES PATENT OFFICE.

G. H. SEALEY AND JAMES LEE, OF NEW YORK, N. Y.

CASE FOR EXHIBITING STEREOSCOPIC PICTURES.

Specification of Letters Patent No. 27,572, dated March 20, 1860.

*To all whom it may concern:*

Be it known that we, G. H. SEALEY and JAMES LEE, both of the city, county, and State of New York, have invented certain new and useful Improvements in Stereoscopic Cases; and we do hereby declare that the following is a full, clear, and exact description of the same, reference being had to the accompanying drawings, forming a part of this specification, in which—

Figure 1, represents a longitudinal vertical section of our invention taken in the plane indicated by the line *x, x,* Fig. 2, and; Fig. 2, is a transverse vertical section of the same, taken in the line *y, y,* Fig. 1, indicating the plane of section.

Similar letters of reference in both views, indicate corresponding parts.

In stereoscopic cases in which a number of pictures is to be exhibited by an easy and simple operation, such as the turning of a crank or of a knob, the picture holders are generally arranged either on an endless or on a continuous band or apron. Where endless bands or aprons are used, the picture holders in passing the lowest point are brought in an inverted position and the pictures are very liable to drop out, so that it becomes necessary to secure the pictures by a hook or by some other means whereby a changing of the same becomes necessarily very tedious; furthermore the construction of such chains is very complicated rendering cases containing the same rather expensive. On the other hand where continuous bands or aprons are employed for the purpose of bringing a series of pictures before the eye-glasses. The operator has not sufficient control over his chain of pictures, and the latter becomes easily deranged. The picture holders, instead of turning down flat one on the top of the other, very often remain in an upright position, whereby the operation is disturbed. Such chains however, can be made at a much smaller expense and for these reasons we have endeavored to combine the correct operation of an endless chain with the cheapness of a continuous chain for the purpose of bringing a series of pictures before the eyeglasses of a stereoscopic case.

Our picture holders are secured to an apron band or bands, which pass over a roller and the ends of which wind in opposite directions, around a shaft to which a rotary motion may be imparted in either direction; the picture holders are secured to the apron band or bands simply by means of tacks or screws, so that the same as the shaft is rotated, pass over the roller in the proper position to bring the pictures before the eye glasses. In order to be able to fasten the picture holders, it is essential to make the cross bars of said picture holders of wood so that they can be fastened by means of tacks. For the purpose of retaining the pictures we employ spring clasps which can be constructed at a trifling expense and which allow of changing the pictures without difficulty.

To enable those skilled in the art to make and use our invention, we will proceed to describe its construction and operation with reference to the drawing.

The box A, with the reflector or reflectors B, and with the eyeglasses C, is constructed in the usual manner. We have represented two reflectors, and two pairs of eyeglasses, in order to show that our improvements are equally applicable to cases with double and with single eyeglasses.

In order to bring the pictures one after the other before the eyeglasses, we employ a shaft D, which rotates near to the bottom of the box, having its bearings in longitudinal slots *a*, which allow the said shaft, a certain amount of play in an up and down direction. The ends of one or two bands E, wind in opposite directions around the shaft D, and each end is firmly secured to the same. When two bands are used they must be of equal lengths, and they are arranged as clearly represented in Fig. 2, one end of each band being fastened to the middle, and the other ends at equal distances from and on either side of the middle of the shaft D. One apron may however be employed with equal advantage provided the width of the same does not exceed one half the width of the picture holders, and the ends of said apron would have to be secured to the shaft D, one on one side and the other on the opposite side of its middle, winding on the same in opposite directions. Instead of one shaft D, two or more shafts might be employed, connected to one another by means of cogwheels, and the ends of the bands, or of the apron might thus be fastened to different shafts. This arrangement however we consider an equivalent of our single shaft with the ends of the band or apron fastened to it and wound on the same in opposite directions.

The bands E, pass over a smooth rod or roller F, secured in the upper part of the box A, at such a distance below the eyeglasses, that the centers of the pictures, are brought as near as possible opposite the centers of the eyeglasses, when the bands E, are fastened to the shaft D, they are drawn up tight, so as to raise said shaft up against the upper edges of the slots $a$, and in order to keep said bands tight even if they stretch, the shaft D, is subjected to the action of springs $b$, which have a tendency to depress the same and force it away from the roller F.

G, are the picture holders which consist simply of a bar of wood $c$, to one side of which the spring clasps $d$, are rigidly attached. The bars $c$, are secured to the bands E, one close over the other by means of tacks $e$, as clearly shown in Fig. 2, and it must be remarked that it is essential to make the bars of wood, for no other material would allow of attaching the bands to the bars so readily and with so little expense. Besides the weight of the picture holders ought to be as small as possible, for if the same would be made of heavy material, the strain caused by their combined weight would prove injurious to the bands.

The clasps $d$, consist of two springs made of sheet metal, and firmly secured in the upper side of the bars $c$, one near to each end of the same, and at such distances apart that sufficient room is left between them for stereoscopic pictures of ordinary size. The upper ends of said springs, are bent out a little as clearly shown in Fig. 1, so that the pictures can be readily forced down between them, and these clasps are furthermore so arranged that each is capable of taking two pictures, one for each pair of eye glasses in double cases.

In the lower part of the box and on either side of the shaft D, are the stops H, arranged in such a position, that the extreme picture holder, on one end of the chain, strikes against the stops on one side of the shaft, just when the extreme picture holder on the other end of the chain comes in a vertical position before the eyeglasses, and at the same time the knobs which serve to turn the shaft D, are so arranged, that they turn around, independent from the shaft as soon as an extraordinary obstruction opposes its motion in one direction or in the other. In case any person from ignorance or carelessness should attempt to turn the shaft farther than the length of the bands E, will allow, the stops H, will oppose the motion of the bands, and the knobs begin to turn independent from the shaft so as to prevent any injury to the working parts of the apparatus.

The simplicity of our case and the ease with which it can be operated even by the most inexperienced, is unsurpassed. The chain of pictures is always completely under the control of the operator, in whatever direction the shaft is turned, and it is very easy to change the pictures, or to replace them by new ones. Our continuous chain can be constructed for a trifle and it operates just as easy as the most expensive endless chain.

What we claim as new and desire to secure by Letters Patent, is:

1. The combination of the shaft D, roller F, and bands E, or their equivalents substantially in the manner and for the purpose specified.

2. Having the ends of the aprons or of the bands, which carry the picture holders firmly secured to a rotary shaft D, or its equivalents substantially as specified so that the whole chain of pictures is subjected to a uniform and positive strain in whatever direction the shaft is turned.

3. The arrangement of the spring clasps $d$, in combination with the cross-bars $c$, substantially as and for the purpose set forth.

4. Arranging the picture holders G, with wooden cross bars $c$, substantially as described, so that the same allow of being attached to the bands or apron in a ready and cheap manner.

G. H. SEALEY.
JAMES LEE.

Witnesses:
 JOHN B. DORAN,
 WILLIAM M. MUNN.